(12) United States Patent
Frazier et al.

(10) Patent No.: US 8,516,397 B2
(45) Date of Patent: Aug. 20, 2013

(54) PROXIMITY INTERFACE APPARATUSES, SYSTEMS, AND METHODS

(75) Inventors: Kristopher T. Frazier, Frisco, TX (US); Brian Roberts, Frisco, TX (US); George M. Higa, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 594 days.

(21) Appl. No.: 12/258,691

(22) Filed: Oct. 27, 2008

(65) Prior Publication Data
US 2010/0107099 A1 Apr. 29, 2010

(51) Int. Cl.
*G06F 3/033* (2006.01)
*G06F 3/048* (2006.01)

(52) U.S. Cl.
USPC .......................................... 715/863; 715/862

(58) Field of Classification Search
USPC .................. 715/862, 863, 701–702
See application file for complete search history.

(56) References Cited

U.S. PATENT DOCUMENTS

| | | | | |
|---|---|---|---|---|
| 5,367,614 | A | 11/1994 | Bisey | |
| 6,204,839 | B1 | 3/2001 | Mato | |
| 6,583,801 | B2 * | 6/2003 | Eastty et al. | 715/863 |
| 6,693,653 | B1 * | 2/2004 | Pauly | 715/857 |
| 6,717,600 | B2 * | 4/2004 | Dutta et al. | 715/862 |
| 7,084,855 | B2 * | 8/2006 | Kaku et al. | 345/158 |
| 7,109,975 | B2 * | 9/2006 | Fedorak et al. | 345/173 |
| 7,509,592 | B1 * | 3/2009 | Martinez | 715/862 |
| 7,614,018 | B1 * | 11/2009 | Ohazama et al. | 715/862 |
| 8,139,028 | B2 * | 3/2012 | Warren | 345/157 |
| 2002/0075333 | A1 * | 6/2002 | Dutta et al. | 345/862 |
| 2002/0171690 | A1 * | 11/2002 | Fox et al. | 345/862 |
| 2003/0007017 | A1 * | 1/2003 | Laffey et al. | 345/862 |
| 2004/0189720 | A1 * | 9/2004 | Wilson et al. | 345/863 |
| 2005/0229116 | A1 * | 10/2005 | Endler et al. | 715/862 |
| 2006/0132432 | A1 * | 6/2006 | Bell | 345/156 |
| 2006/0161871 | A1 * | 7/2006 | Hotelling et al. | 715/863 |
| 2007/0055947 | A1 * | 3/2007 | Ostojic et al. | 715/800 |
| 2007/0283263 | A1 * | 12/2007 | Zawde et al. | 715/700 |
| 2007/0294639 | A1 * | 12/2007 | Van Berkel et al. | 715/830 |
| 2008/0018616 | A1 * | 1/2008 | Lampell et al. | 345/173 |
| 2008/0040692 | A1 * | 2/2008 | Sunday et al. | 715/863 |
| 2008/0122796 | A1 * | 5/2008 | Jobs et al. | 345/173 |
| 2008/0122798 | A1 | 5/2008 | Koshiyama et al. | |
| 2008/0288895 | A1 * | 11/2008 | Hollemans et al. | 715/863 |
| 2009/0077504 | A1 * | 3/2009 | Bell et al. | 715/863 |
| 2009/0183125 | A1 * | 7/2009 | Magal et al. | 715/863 |
| 2009/0228841 | A1 * | 9/2009 | Hildreth | 715/863 |
| 2009/0265669 | A1 * | 10/2009 | Kida et al. | 715/863 |
| 2009/0327886 | A1 * | 12/2009 | Whytock et al. | 715/702 |
| 2010/0042954 | A1 * | 2/2010 | Rosenblatt et al. | 715/863 |
| 2010/0050133 | A1 * | 2/2010 | Nishihara et al. | 715/863 |
| 2010/0146464 | A1 * | 6/2010 | Wilson et al. | 715/863 |
| 2011/0041100 | A1 * | 2/2011 | Boillot | 715/863 |

\* cited by examiner

*Primary Examiner* — Matt Kim
*Assistant Examiner* — Ryan Barrett

(57) ABSTRACT

In certain exemplary embodiments, data representative of a proximity heuristic specifying a plurality of levels of an object detection zone associated with a display screen is maintained, an object is detected within the object detection zone, one of the levels is selected based on at least one attribute of the object, and an action associated with the selected level is performed. In certain examples, the action includes modifying a graphical user interface view displayed on the display screen.

17 Claims, 17 Drawing Sheets

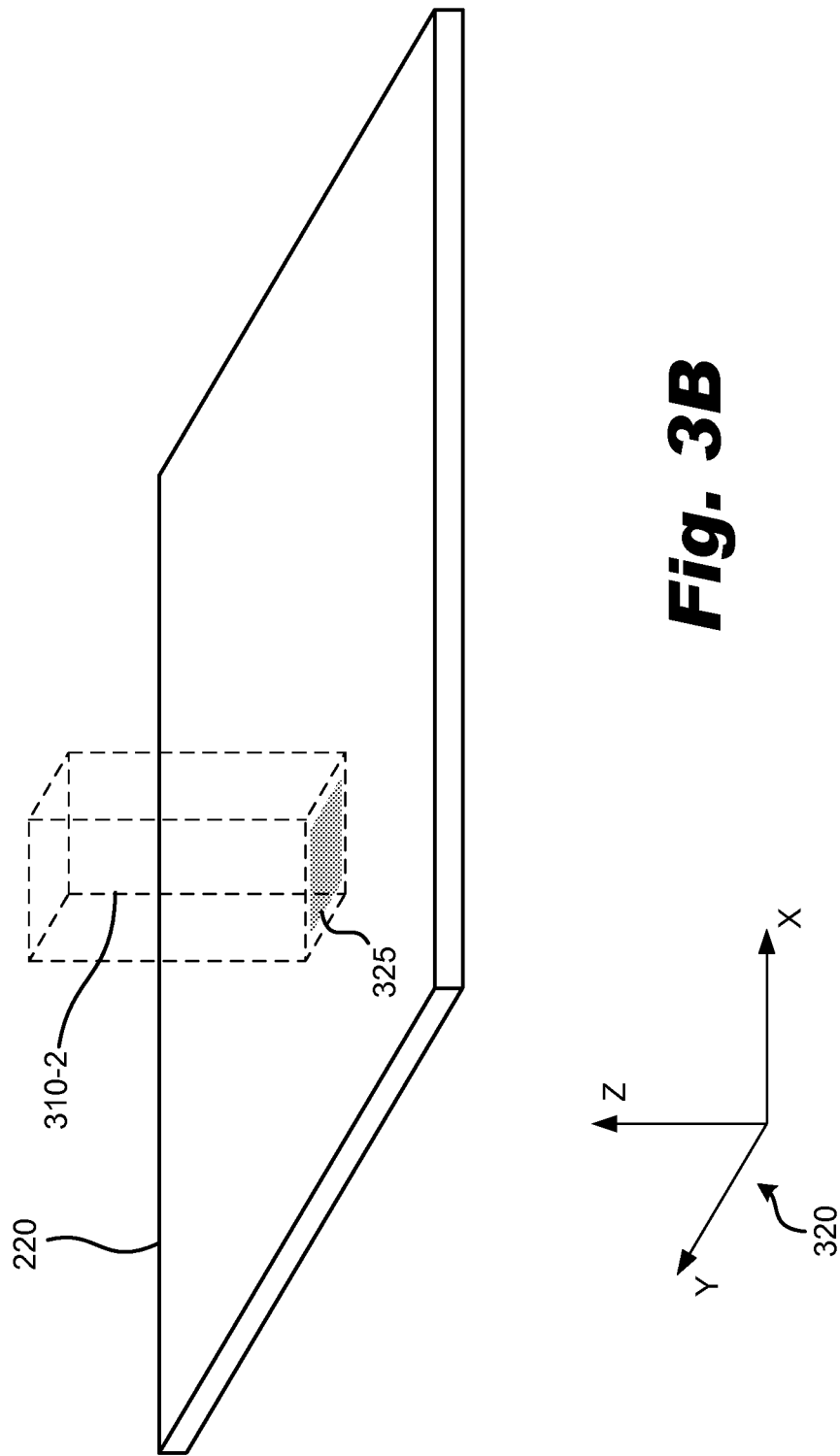

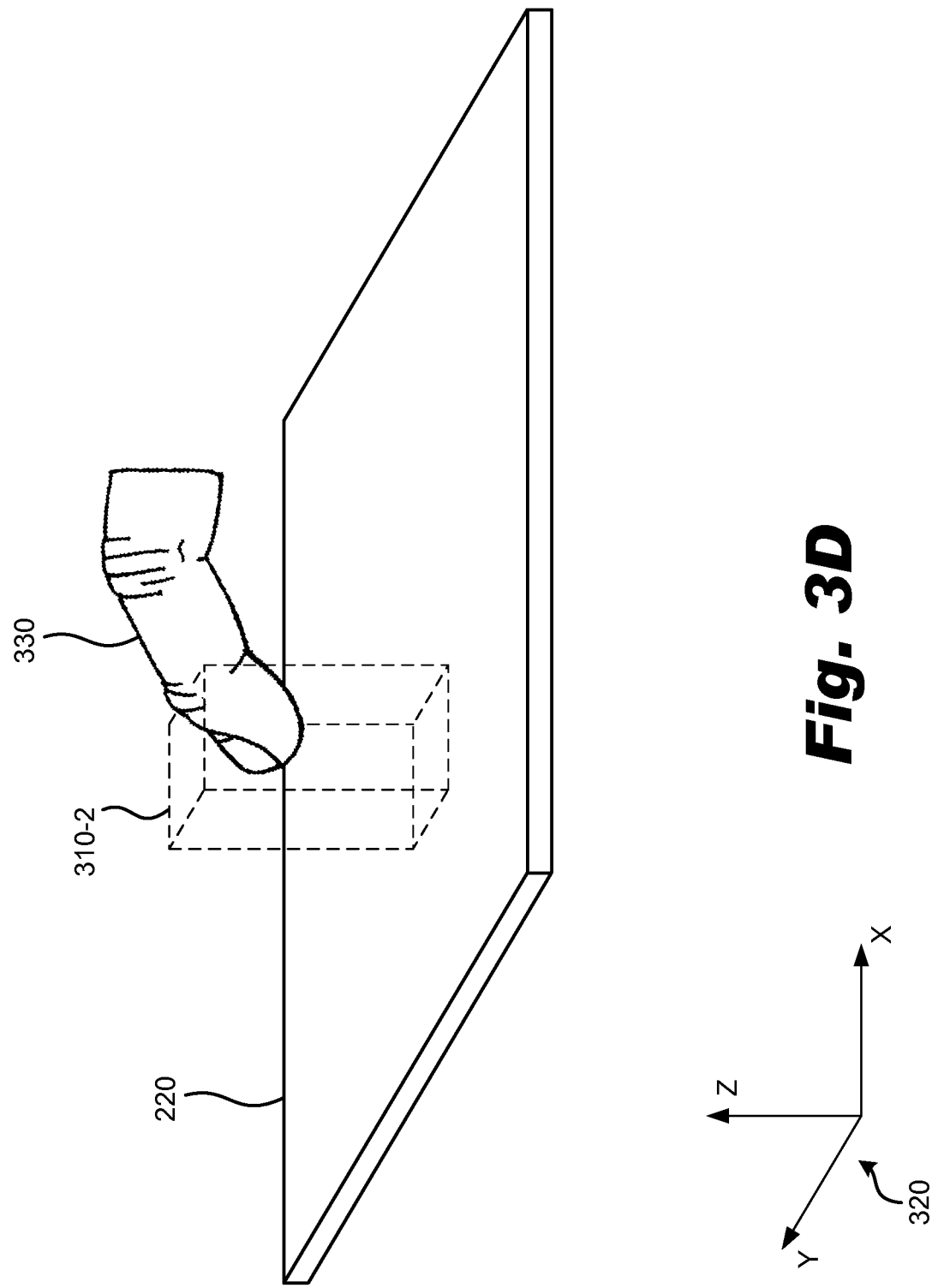

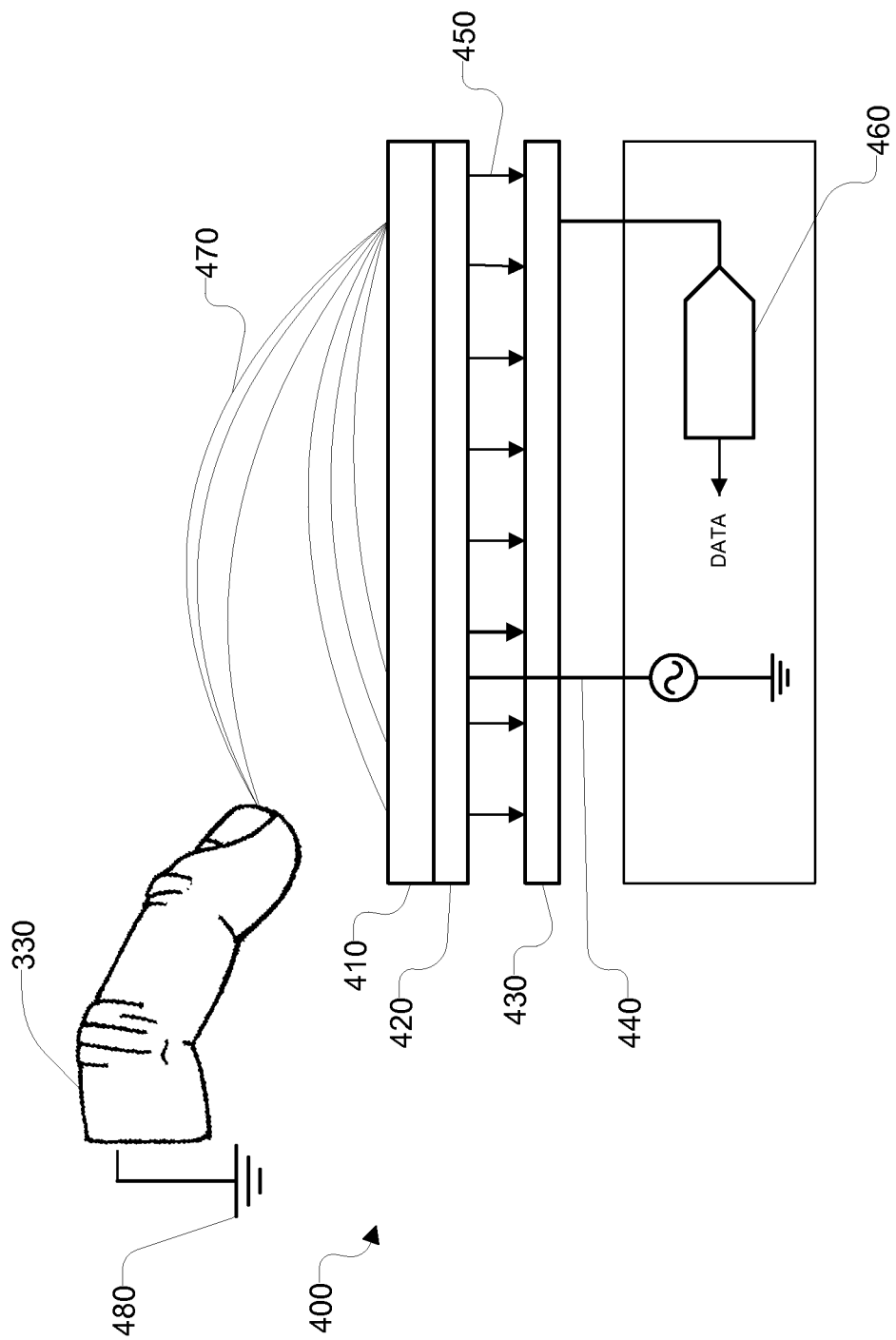

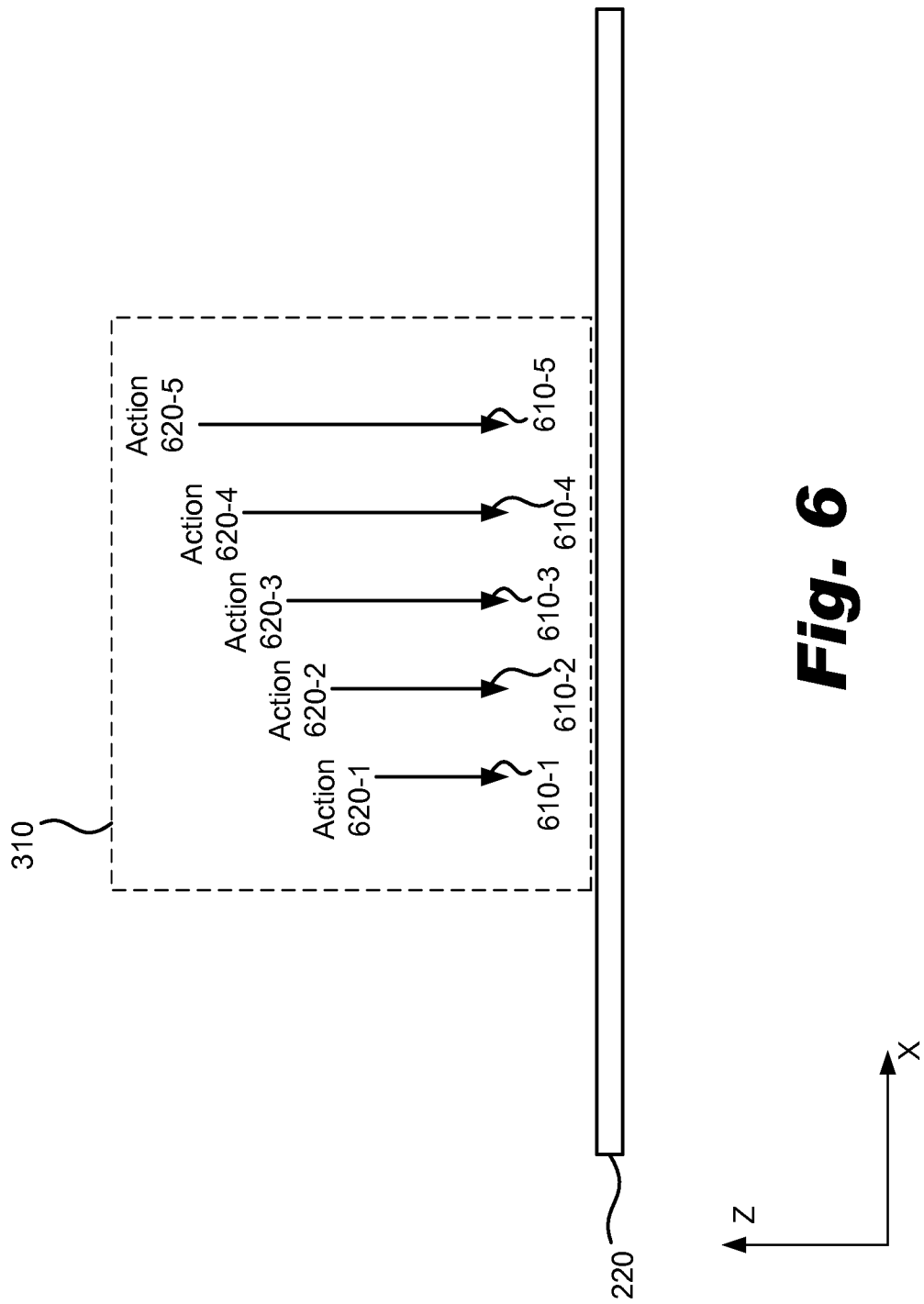

PROXIMITY INTERFACE APPARATUSES, SYSTEMS, AND METHODS

BACKGROUND INFORMATION

Electronic devices continue to increase in complexity and functionality. This poses several challenges to designers of such devices. For example, it may be difficult for a designer to develop and provide an intuitive, functional, and convenient user interface for certain electronic devices, especially devices that are small in size, have limited input mechanisms, and/or have robust functionality.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 3B illustrates a perspective view of another exemplary object detection zone associated with a display screen.

FIG. 3D illustrates a perspective view of an object located within the object detection zone of FIG. 3B.

FIG. 4 illustrates an exemplary capacitance sensor.

FIG. 6 illustrates exemplary speed levels associated with an object detection zone.

DETAILED DESCRIPTION OF PREFERRED EMBODIMENTS

Exemplary proximity interface apparatuses, systems, and methods are described herein. In certain exemplary embodiments, data representative of a proximity heuristic specifying a plurality of levels of an object detection zone associated with a display screen is maintained, an object is detected within the object detection zone, one of the levels is selected based on at least one attribute of the object, and an action associated with the selected level is performed. In certain examples, the action includes modifying a graphical user interface view displayed on the display screen. Examples of proximity heuristics, object detection zones, levels associated with object detection zones, attributes of objects located within object detection zones, and actions associated with levels of object detection zones are described below.

The exemplary proximity interface apparatuses, systems, and methods described herein may facilitate an intuitive, functional, and/or robust user interface. Such a proximity interface may allow a user of a device to control display of a graphical user interface view on a display screen by positioning and/or moving an object (e.g., a finger or thumb) within an object detection zone associated with the display screen. In certain embodiments, the object detection zone may be adjacent to the display screen (e.g., the object detection zone may include a volume space located proximate to and extending away from but not including the display screen) such that an object positioned and/or moved proximate to the display screen may control the display of a graphical user interface view on the display screen, without the object physically touching the display screen. In certain other embodiments, an object detection zone may include an area space on a display screen such that an object touching or otherwise positioned on the display screen may control the display of a graphical user interface view on the display screen.

Exemplary embodiments of proximity interface apparatuses, systems, and methods will now be described in more detail with reference to the accompanying drawings.

Figure 1:
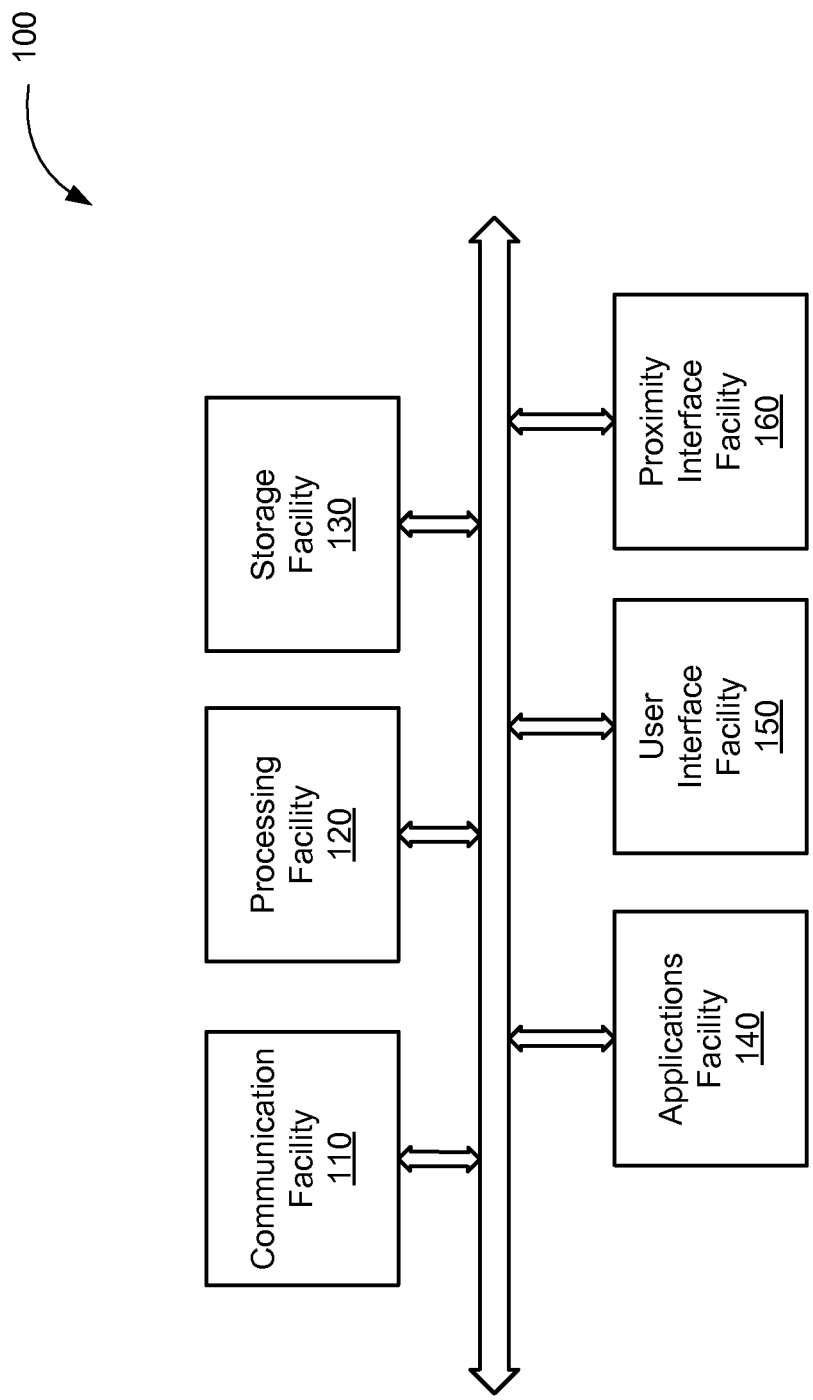
FIG. 1 illustrates a proximity interface system.

FIG. 1 illustrates an exemplary proximity interface system 100 (or simply "system 100"). As shown in FIG. 1, system 100 may include a communication facility 110, processing facility 120, storage facility 130, applications facility 140, user interface facility 150, and proximity interface facility 160 communicatively connected to one another. The facilities 110-160 may be communicatively connected using any suitable technologies and may communicate using any communication platforms and/or technologies suitable for transporting communications, data, and/or signals between the facilities 110-160.

In some examples, system 100 may include any computing hardware and/or instructions (e.g., software programs), or combinations of computing instructions and hardware, configured to perform one or more of the processes described herein. In particular, it should be understood that system 100 or components of system 100 may be implemented on one physical computing device or may be implemented on more than one physical computing device. Accordingly, system 100 may include any one of a number of computing devices, and may employ any of a number of computer operating systems.

One or more of the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computing device can read.

Accordingly, each of the facilities 110-160 may be implemented as hardware, computing instructions (e.g., software) tangibly embodied on a computer-readable medium, or a combination of hardware and tangibly embodied computing instructions configured to perform one or more of the processes described herein. In certain embodiments, for example, proximity interface facility 160 and/or one or more other facilities may be implemented as one or more software applications embodied on a computer-readable medium such as storage facility 130 or other memory and configured to direct processing facility 120 to execute one or more of the processes described herein.

The components of system 100 shown in FIG. 1 are illustrative only. Other embodiments may add, omit, or reconfigure one or more components. In certain embodiments, for example, communication facility 110 may be omitted.

Figure 2:
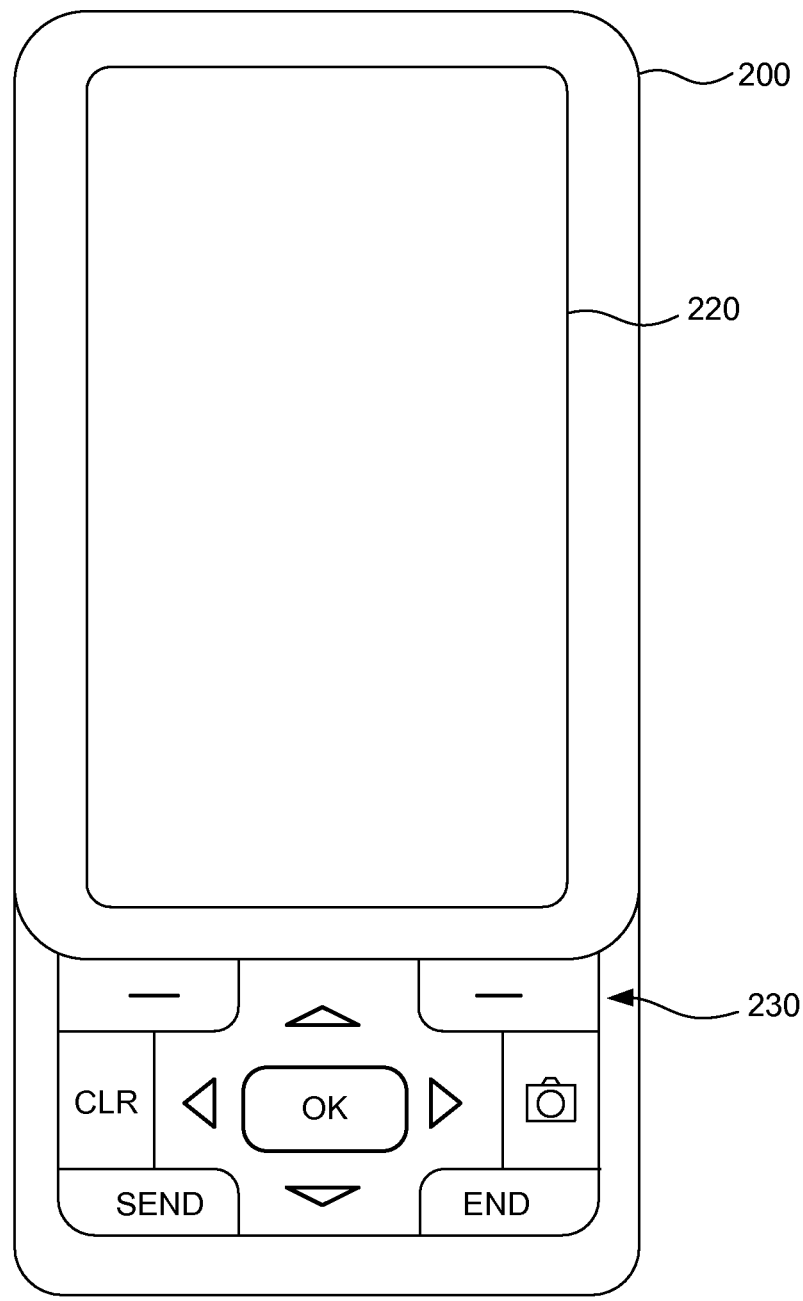
FIG. 2 illustrates an exemplary device having the system of FIG. 1 implemented therein.

System 100 may be implemented as may suit a particular application. FIG. 2 illustrates an exemplary device 200 having system 100 implemented thereon. Device 200 may include one or more of the facilities 110-160 shown in FIG. 1 and may be configured to perform one or more of the processes and/or operations described herein. Device 200 may include, but is not limited to, a mobile device (e.g., a mobile phone device), media device, handheld device, computer, gaming device, phone device (e.g., Verizon Hub device), communications device, navigation device, entertainment device, vehicular device, personal-digital assistant, digital camera, and any other device having one or more components of system 100 implemented therein.

Device 200 may include a display screen 220 configured to display one or more graphical user interfaces ("GUIs") for viewing by a user of device 200. Display screen 220 may be included in user interface facility 150, as described further below. In certain embodiments, display screen may comprise a touch screen display configured to sense touch input. The touch screen display may employ single-touch and/or multi-touch touch screen technologies. Examples of GUIs and various GUI views that may be displayed on display screen 220 are described in detail further below. Device 200 may also include input mechanisms such as one or more of the input buttons 230 shown in FIG. 2.

Each of the facilities 110-160 shown in FIG. 1 will now be described in more detail.

Communication facility 110 may be configured to send and/or receive communications to/from one or more external devices (e.g., a server). Communication facility 110 may include and/or employ any device, logic, communication media, communication protocols, and/or other technologies suitable for transmitting and receiving communications signals and data. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, Fiber-to-the-premises ("FTTP") technologies, Passive Optical Network ("PON") technologies, and other suitable communications networks and technologies.

Processing facility 120 may include one or more processors and may be configured to execute and/or direct execution of one or more processes or operations described herein. Processing facility 120 may direct execution of operations in accordance with computer-executable instructions such as may be stored in storage facility 130 or another computer-readable medium. As an example, processing facility 120 may be configured to process data, including demodulating, decoding, and parsing acquired data, and encoding and modulating data for transmission by communication facility 110.

Storage facility 130 may include one or more data storage media, devices, or configurations and may employ any type, form, and combination of storage media. For example, the storage facility 130 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Electronic data (e.g., data representative of a proximity heuristic) may be temporarily and/or permanently stored in the storage facility 130.

Applications facility 140 may include any combination of hardware, software, and/or firmware configured to execute one or more applications. In certain embodiments, applications facility 140 includes at least one software application tangibly embodied on a computer readable medium and configured to direct processing facility 120 to perform one or more application operations. Examples of such applications may include, but are not limited to, media player applications, media content processing applications, menu applications, image viewer applications (e.g., 3-D image viewer applications), and communications applications (e.g., phone, messaging, and/or web browser applications).

User interface facility 150 may be configured to present output to a user. For example, user interface facility 150 may include one or more components configured to display a GUI for viewing by a user. Any suitable display components and technologies may be employed by user interface facility 150, including a display screen 220 and one or more display screen drivers. Exemplary GUI views that may be displayed on a display screen 220 of user interface facility 150 are illustrated in the accompanying drawings and described further below.

User interface facility 150 may be configured to receive input from a user. As mentioned above, in certain embodiments, user interface facility 150 may include one or more touch screen components configured to receive user input. Any suitable touch screen components and technologies may be employed by user interface facility 150. For example, user interface facility 150 may include a touch screen having one or more sensors configured to sense one or more objects touching a surface of the touch screen. An object touch on the touch screen may be sensed in any suitable way and using any suitable sensor technologies, including capacitance, heat, and/or optic sensor technologies, for example.

In certain embodiments, user interface facility 150 may include a combination of display components and touch screen components. For example, user interface facility 150 may include a touch screen display configured to concurrently display a GUI and to sense one or more object touches on a surface of the touch screen display.

User interface facility 150 may be configured to interact with applications facility 140. For example, user interface facility 150 may send and receive data and/or signals to/from applications facility 140, including providing data signals representative of sensed user input and receiving data signals representative of user output. For instance, user interface facility 150 may receive GUI data from applications facility 140 and generate and display a GUI based on the GUI data. User interface facility 150 may also provide data representative of sensed user input to applications facility 140 for use by one or more applications.

Figure 3A:
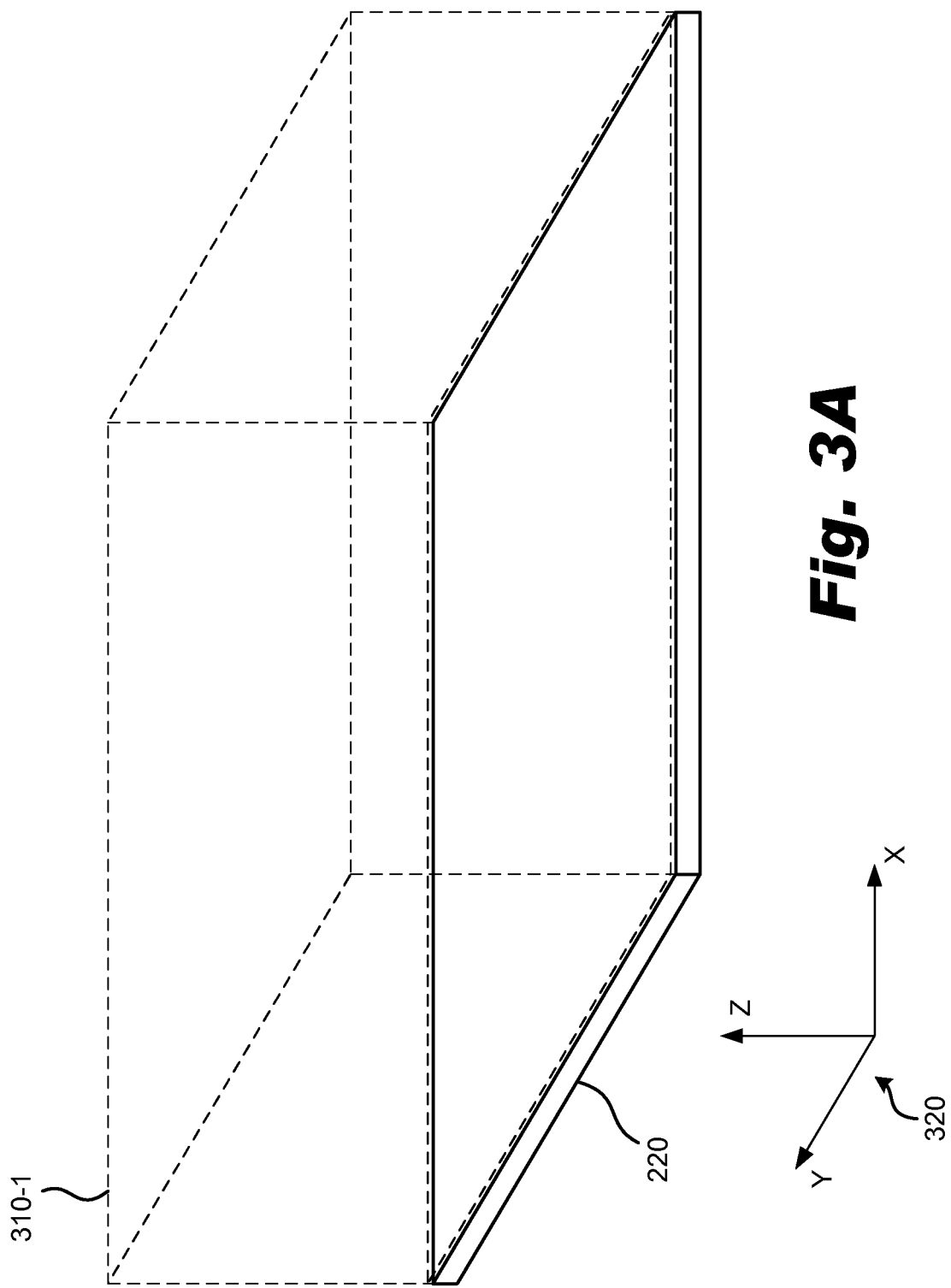
FIG. 3A illustrates a perspective view of an exemplary object detection zone associated with a display screen.

Proximity interface facility 160 may be configured to detect an object located within an object detection zone associated with a display screen 220. In certain embodiments, an object detection zone may include a space located adjacent to a display screen 220. FIG. 3A illustrates an exemplary object detection zone 310-1 adjacent to but not including display screen 220. As shown, object detection zone 310-1 may include a volume space positioned proximate to and extending away from a surface of the display screen 220. In the illustrated example, object detection zone 310-1 comprises a generally three dimensional ("3-D") rectangular space defined by the dashed lines and positioned proximate to the surface of the display screen 220.

Object detection zone 310-1 may be defined and/or described with reference to a coordinate system 320 having directional axes "X," "Y," and "Z," which may be oriented as shown in FIG. 3A. As illustrated, the surface of the display screen 220 may be positioned within an X-Y plane, and object detection zone 310-1 may comprise an X-Y planar area having a size substantially corresponding to the surface area of the display screen 220 and extending a certain distance away from the display screen 220 in the direction of the Z axis to create the volume space shown in FIG. 3A. Coordinate system 320 may be used to define, determine, and/or describe a position and/or one or more other attributes of an object located within object detection zone 310.

In certain embodiments, object detection zone 310-1 does not include the surface of the display screen 220. In such embodiments, proximity interface facility 160 may be configured to interact with user interface facility 150 such that system 100 may receive and use different types of user input. For example, proximity interface facility 160 may be configured to detect an object located in object detection zone 310-1 and identify proximity-based user input from the detected proximate object. Additionally or alternatively, one or more touch screen components of user interface facility 150 may be configured to detect an object touching the surface of the display screen 220 and identify touch-based user input from the detected object touching the display screen 220. In certain examples, one type of user input may be prioritized over another type of user input. For instance, touch-based user input may be prioritized over proximity-based user input in some implementations.

As shown, a size component of object detection zone 310-1 (e.g., the X-Y planar area of the object detection zone 310-1) may substantially correspond with a size (e.g., the surface area) of the display screen 220. Accordingly, a positioning of an object within object detection zone 310-1 that is substantially perpendicular to a particular position on the surface of the display screen 220 may be detected by proximity interface facility 160 to correspond to that position.

The exemplary object detection zone 310-1 shown in FIG. 3A is illustrative only. Other object detection zones having different shapes, sizes, orientations, and/or other parameters and/or associations with display screen 220 may be used in other embodiments. FIG. 3B illustrates a perspective view of another exemplary object detection zone 310-2 located adjacent to display screen 220. As shown in FIG. 3B, object detection zone 310-2 may be positioned proximate to and extend away from a portion of the display screen 220. In this or similar manner, object detection zone 310-2 may be associated with a particular portion of the display screen 220. For example, a GUI displayed on display screen 220 may include a graphic 325 (e.g., a folder, file, or menu item icon). The displayed graphic 325 may occupy only a portion of the display screen 220, and object detection zone 310-2 may be positioned proximate to and extend away from the portion of the display screen 220 displaying the graphic 325.

Figure 3C:
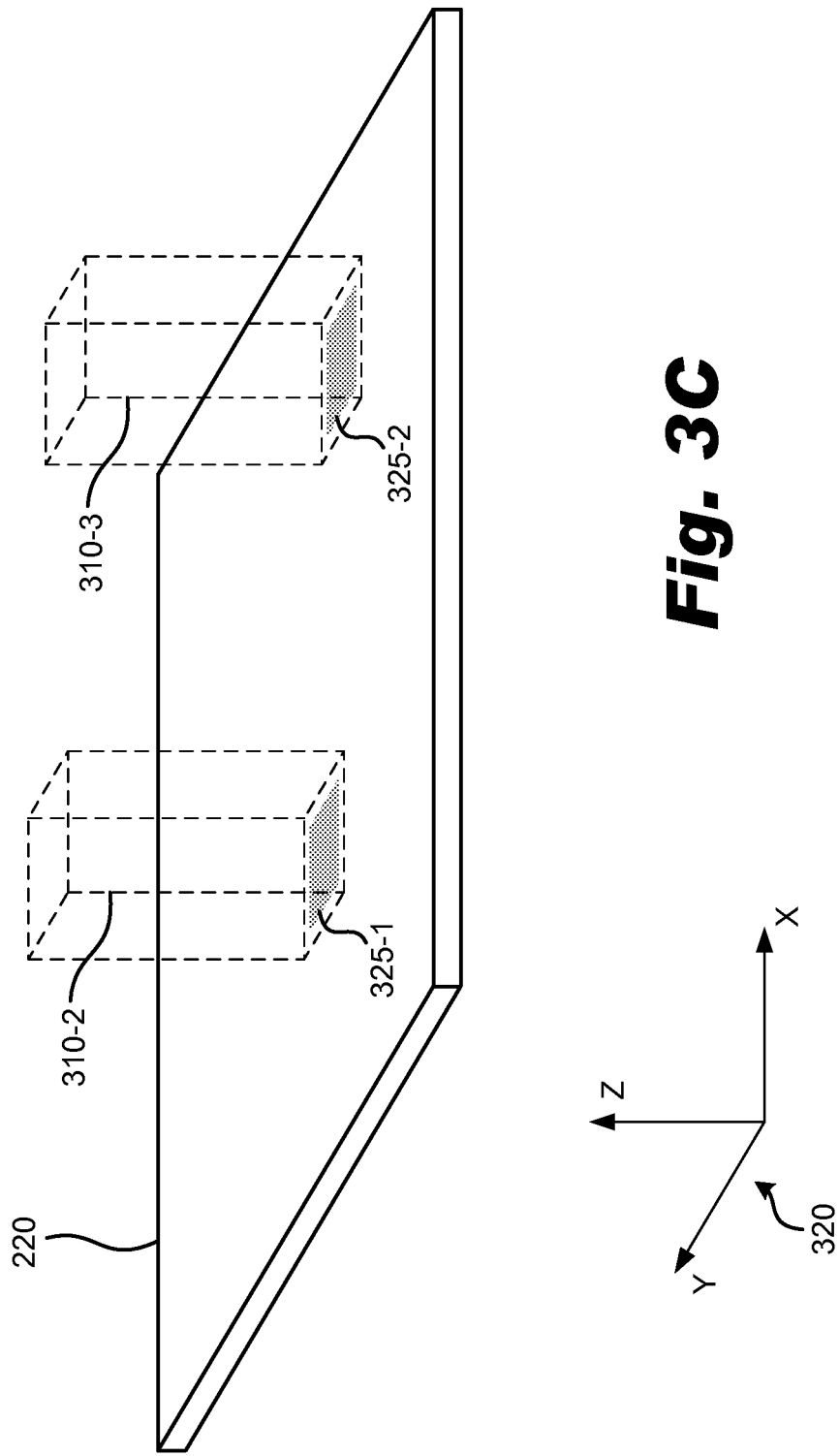
FIG. 3C illustrates a perspective view of multiple exemplary object detection zones associated with a display screen.

In certain embodiments, multiple object detection zones may be associated with a display screen 220. For example, object detection zones may be associated with different area portions of the display screen 220. FIG. 3C illustrates object detection zone 310-2 and another object detection zone 310-3 located adjacent to but not including different area portions of display screen 220. FIG. 3C further illustrates exemplary graphics 325-1 and 325-2 that may be displayed on the display screen 220 and with which object detection zones 310-2 and 310-3 may be respectively associated.

While various object detection zones and configurations of object detection zones are illustrated in FIGS. 3A-3C, the examples are illustrative only. Other object detection zones and/or configurations of object detection zones may be used in other embodiments. For example, instead of a 3-D rectangular-shaped object detection zone, an object detection zone having a hemispherical shape may be used. Object detection zones such as those illustrated in FIGS. 3A-3C will be generally referred to as "object detection zones 310."

FIG. 3D illustrates a perspective view of an object 330 located within the object detection zone 310-2 of FIG. 3B. In the example shown in FIG. 3D, object 330 includes a human finger. This is illustrative only and not limiting in any sense. Any object that may be detected by proximity interface facility 160 as being located within an object detection zone 310 may be used. For example, object 330 may include a human finger or thumb, a stylus, or any other tangible object that may be positioned within and detected by the proximity interface facility 160 as being positioned within an object detection zone 310. As used herein, detection of an object 330 within an object detection zone 310 may include detection of an object 330 positioned within the object detection zone 310 as shown in FIG. 3D and/or detection of an object 330 entering into or exiting from an object detection zone 310.

Object 330 may be detected as being located within an object detection zone 310 in any suitable way and using any suitable technologies. For example, user interface 150 and/or proximity interface facility 160 may include one or more sensors configured to sense an object 330 located within an object detection zone 310. In certain embodiments, the shape of an object detection zone 310 may be defined by one or more detection capabilities (e.g., detection range) of the sensors.

Any type and configuration of sensors and/or other components suitable for sensing object 330 may be used. Examples of such components may include, but are not limited to, one or more capacitance sensors, optic sensors, heat sensors, electromagnetic signal transmitters and/or sensors (e.g., infrared sensors), other suitable sensors, or any combination or sub-combination of the above.

In certain embodiments, proximity interface facility 160 may include a plurality of infrared sensors configured to detect one or more types of objects 330 (e.g., a human finger or thumb) located with an object detection zone 310. The infrared sensors may include passive infrared sensors, active infrared transmitters and sensors, or a combination thereof. For active infrared sensing, proximity interface facility 160 may include one or more infrared signal transmitters configured to cast an object detection zone 310 or field. When an object 330 enters into or is otherwise positioned within the infrared field cast by the infrared signal transmitters, one or more infrared sensors may detect the object 330 located within the field.

Alternatively or additionally, in certain other embodiments, one or more capacitance sensors may be used to detect an object 330 located within an object detection zone 310. FIG. 4 shows an exemplary capacitance sensor 400 that may be used to detect an object 330 located within an object detection zone 310. Capacitance sensor 400 may include a plastic cover 410 configured to function as a protective surface. Sensor 400 may also include a transmitter 420 and a receiver 430. The transmitter 420 and the receiver 430 may each include metal traces (or other electrically conductive traces) formed on layers of a printed circuit board ("PCB"). An excitation signal path 440 may be connected to the transmitter 420, such that an electric field 450 is formed between the transmitter 420 and the receiver 430. The electric field 450 may be substantially concentrated between the transmitter 420 and the receiver 430. The strength of the electric field 450 may be measured by a capacitance-to-digital converter 460.

Sensor 400 may be configured such that a fringe electric field 470 may extend from the transmitter 420, out of the PCB, and terminate back at receiver 430, such that the fringe electric field 470 is positioned over the plastic cover 410 surface of the sensor 400. When an object 330 (e.g., a human finger or thumb) intersects the fringe electric field 470, a portion of the electric field 450 is shunted to a ground 480 instead of terminating at the receiver 430. The resultant decrease in capacitance may be detected by the capacitance-to-digital converter 460 and may indicate an object 330 located within an object detection zone 310.

The sensitivity of the capacitance sensor 400 may be set at higher or lower levels based on certain predetermined adjustments, as may suit a particular implementation. Higher sensitivity levels may be used to detect an object 330 at a greater distance away from the surface of the sensor 400 than when the sensitivity is set at lower levels. In certain examples, a size (e.g., depth) of an object detection zone 310 may be determined by sensitivity of one or more capacitive sensors 400.

Sensors may be configured as may suit a particular implementation. In certain examples, multiple sensors may be arranged to form a grid of sensors associated with display screen 220. The sensor grid may be positioned within a plane (e.g., an X-Y plane) that is generally parallel to a surface of display screen 220. Such a grid may be conducive to a determination of a position of an object 330 within an object detection zone 310. The position may be identified in terms of coordinate system 320. In certain embodiments, for example, a coordinate position of an object 330, or at least certain coordinate values associated with a position of an object 330, may be determined based at least in part on data acquired by one or more of the sensors (referred to herein as "sensor data").

Proximity interface facility 160 may be configured to maintain a proximity heuristic, which may be configured to guide interpretation of and reaction to detection of an object 330 within object detection zone 310. Data representative of the proximity heuristic may be stored in a computer-readable medium such as storage facility 130, for example, and may be configured to direct one or more operations performed by processing facility 120 and/or proximity interface facility 160.

The proximity heuristic may specify one or more rules for determining one or more attributes of a detected object 330 based on sensor data. An object attribute may include any attribute of object 330, including, but not limited to, a position, speed, direction, orientation, distance from display screen 220, distance from a particular position (e.g., an area where a graphic is displayed) on display screen 220, trajectory, and/or shape of object 330. Such attributes may be determined in any suitable way and in accordance with the proximity heuristic.

For instance, in response to a detection of an object 330 within an object detection zone 310, proximity interface facility 160 may analyze sensor data associated with the object 330 to determine one or more attributes of the object 330 in accordance with the proximity heuristic. As an example, the proximity heuristic may specify one or more shape patterns, and proximity interface facility 160 may be configured to compare sensor data with the shape patterns to identify a shape of object 330. In some examples, a shape pattern may specify data typical of a human finger or thumb, for example, and sensor data may be compared with such a shape pattern to determine whether the detected object 330 may have a human finger or thumb shape.

Identification of a shape of object 330 may be useful for determining one or more other attributes of the object 330. For example, from an identified shape, proximity interface facility 160 may determine an orientation of object 330, such as which way a human finger or thumb is oriented. As another example, identification of an object shape may be used to identify a position of an object 330. When an object 330 is determined to have a shape of a human finger or thumb, for example, a position of the object 330 may be determined to be at a point on a tip of the finger or thumb. This position may coincide with the part of the object 330 that is nearest to the display screen 220.

The proximity heuristic may specify one or more rules for determining other attributes. For example, the proximity heuristic may specify one or more equations and/or algorithms configured to utilize object position data to calculate distance of an object 330 from display screen 220 and/or from a particular point or area on the display screen 220. In certain examples, distance from the display screen 220 may be set to a z-axis value associated with coordinates for a position of an object 330. In other examples, position coordinates for two positions may be used to calculate a distance between the positions. Other suitable distance equations and/or algorithms may be used in other embodiments.

As additional examples, the proximity heuristic may specify one or more equations and/or algorithms that may be used to calculate speed, direction, acceleration, and/or trajectory of an object 330. Accordingly, proximity interface facility 160 may be configured to calculate such attributes of object 330. In certain examples, proximity interface facility 160 may be configured to record data associated with an object 330 over time. The recorded data, including time data, may be used to determine object attributes such as object speed, direction, and/or trajectory. Proximity interface facility 160 may be configured to use one or more of these object attributes to predict a target (e.g., a particular area of the display screen 220) toward which the object 330 may be headed.

The proximity heuristic may specify a plurality of levels associated with an object detection zone 310. The levels may include predefined threshold values and/or ranges associated with one or more object attributes. For example, certain exemplary levels may include distance levels associated with position and/or distance attributes of an object 330, position levels associated with position attributes of an object 330, speed levels associated with speed attributes of an object 330, trajectory levels associated with trajectory attributes of an object 330, acceleration levels associated with acceleration attributes of an object 330, combinational levels associated with combinations of attributes of an object 330, and any other types of levels associated with one or more attributes of an object 330.

The proximity heuristic may further specify one or more associations between each of the levels of an object detection zone 310 and one or more actions. As described in detail further below, in response to detection of an object 330 within an object detection zone 310, proximity interface facility 160 may select one of a plurality of levels based on at least one attribute of the object 330 and initiate performance of an action associated with the selected level.

Figure 5:
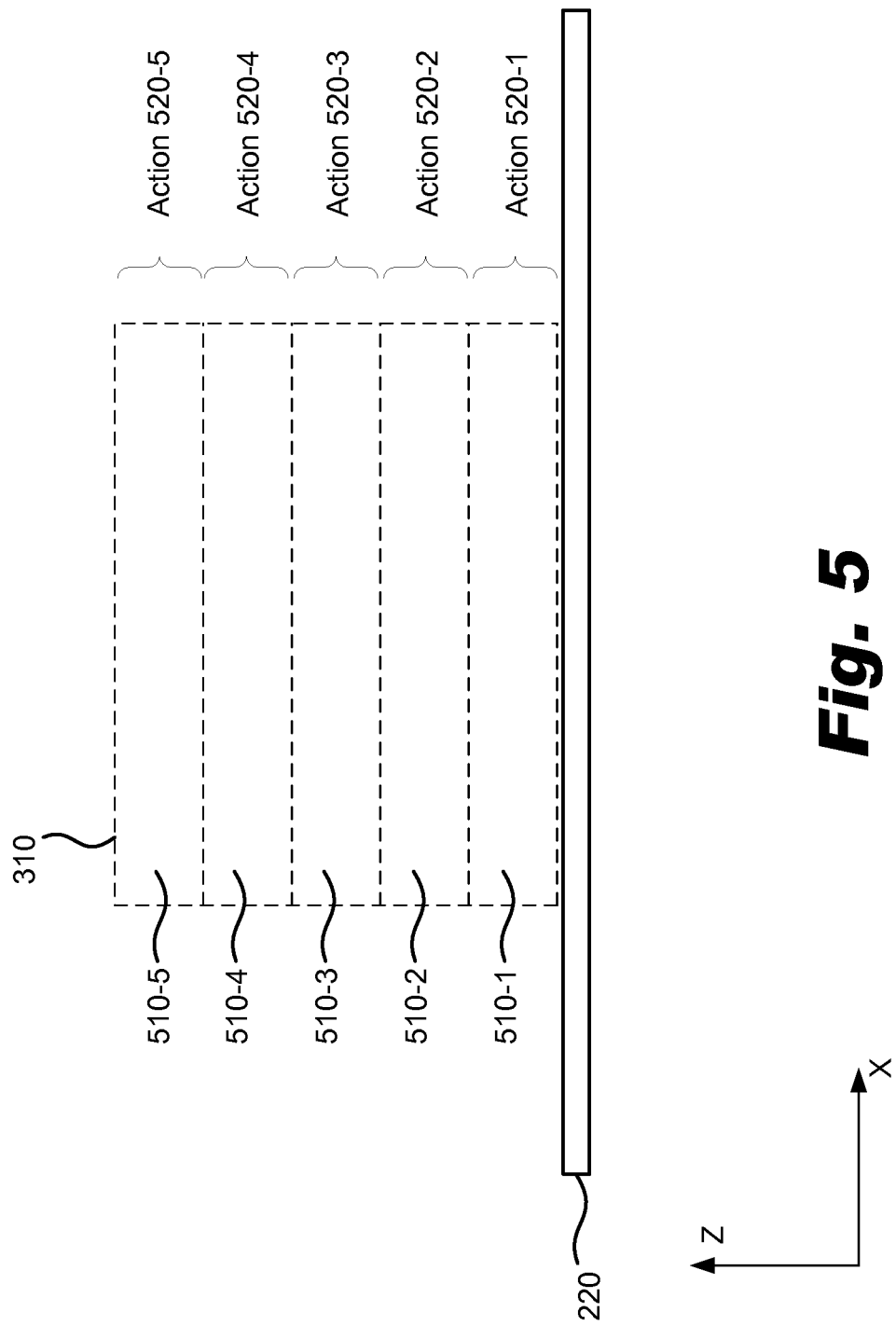
FIG. 5 illustrates a cross-sectional side view of exemplary distance levels associated with an object detection zone.

To help facilitate an understanding of levels and associated actions that may be specified by the proximity heuristic, FIG. 5 illustrates a cross-sectional side view of an exemplary object detection zone 310 and a plurality of distance levels 510-1 through 510-5 (collectively "distance levels 510") associated with the object detection zone 310. The cross-sectional side view of FIG. 5 shows an exemplary X-Z planar view of the object detection zone 310.

In the illustrated example, the plurality of distance levels 510 comprises a plurality of distance intervals. Each distance interval may include a range of distances, such as a range of distances from the display screen 220 as measured along the Z-axis. For example, distance level 510-1 may comprise a first range of distances, distance level 510-2 may comprise a second range of distances, distance level 510-3 may comprise a third range of distances, distance level 510-4 may comprise a fourth range of distances, and distance level 510-5 may comprise a fifth range of distances away from the surface of the display screen 220. The exemplary distance levels 510 shown in FIG. 5 are illustrative only. Other distance levels 510 may be defined in other implementations. For example, alternative to each of the distance levels 510 including a range of distances, each distance level 510 may comprise a discrete distance value corresponding to a distance away from the surface of the display screen 220.

Each of the distance levels 510 may be associated with one or more actions (e.g., actions 520-1 through 520-5, collectively referred to herein as "actions 520"), as specified by the proximity heuristic. In the example shown in FIG. 5, distance level 510-1 is associated with a first action 520-1, distance level 510-2 is associated with a second action 520-2, distance level 510-3 is associated with a third action 520-3, distance level 510-4 is associated with a fourth action 520-4, and distance level 510-5 is associated with a fifth action 520-5.

In response to detection of an object 330 within object detection zone 310, in certain implementations, proximity interface facility 160 may determine an object attribute such as a distance of the object 330 away from the display screen 220, select one of the distance levels 510 specified by the proximity heuristic based on the distance of the object 330 away from the display screen 220, and initiate performance of an action 520 specified by the proximity heuristic as being associated with the selected distance level 510. For example, object 330 may be detected at a position within distance level 510-5. In response, proximity interface facility 160 may select distance level 510-5 based on the distance of the object 330 away from the display screen 220 and initiate performance of action 520-5 in accordance with the proximity heuristic.

A change to an attribute of the object 330 may be subsequently detected. For example, the object 330 may move to another position within the object detection zone 310. The new position may be a different distance away from the display screen 220 than the previous position and may fall within a different distance level 510-4. Accordingly, proximity interface facility 160 may select distance level 510-4 based on the new object position and initiate performance of action 520-4 in accordance with the proximity heuristic. Proximity interface facility 160 may operate similarly when object 330 is detected at positions within distance level 510-3, 510-2, or 510-1. Accordingly, an appropriate distance level 510 may be selected and an associated action 520 identified and performed based on the distance of the object 330 from the display screen 220 and in accordance with one or more rules specified by the proximity heuristic. When an object 330 moves from one distance level 510 to another distance level 510, different actions may be performed for each distance level 510.

FIG. 6 illustrates another type of level that may be specified by the proximity heuristic in other embodiments. In particular, FIG. 6 illustrates an exemplary object detection zone 310 and a plurality of speed levels (e.g., speed levels 610-1 through 610-5, collectively referred to herein as "speed levels 610") associated therewith. In the illustrated example, the plurality of speed levels 610 comprises a plurality of speed intervals. Each speed interval may include a range of speeds, such as a range of speeds at which an object 330 may move toward display screen 220 in the Z-axis direction. For example, speed level 610-1 may comprise a first range of speed values, speed level 610-2 may comprise a second range of speed values, speed level 610-3 may comprise a third range of speed values, speed level 610-4 may comprise a fourth range of speed values, and speed level 610-5 may comprise a fifth range of speed values. The exemplary speed levels 610 shown in FIG. 6 are illustrative only. Other speed levels 610 may be defined in other implementations. For example, alternative to a range of speeds, each speed level 610 may comprise a discrete speed value in certain implementations.

Each of the speed levels 610 shown in FIG. 6 may be associated with one or more actions (e.g., actions 620-1 through 620-5, collectively referred to herein as "actions 620"), as specified by the proximity heuristic. In the example shown in FIG. 6, speed level 610-1 is associated with action 620-1, speed level 610-2 is associated with action 620-2, speed level 610-3 is associated with action 620-3, speed level 610-4 is associated with action 620-4, and speed level 610-5 is associated with action 620-5.

A speed at which an object 330 moves toward the display screen 220 may fall within one of the speed levels 610 specified by the proximity heuristic, and a particular action 620 associated with the speed level 610 may be identified and performed based on the determined speed of the object 330. As an example, object 330 may be determined to be moving toward the display screen 220 at a certain speed. Proximity interface facility 160 may select one of the speed levels 610 (e.g., speed level 610-3) based on the speed of the object 330 and initiate performance of a corresponding action 620 (e.g., action 620-3). In this or similar manner, a speed level 610 may be selected and a corresponding action identified and performed based on a speed of an object 330.

While exemplary distance levels 510 and speed levels 610 associated with an object detection zone 310 have been described above, these examples are illustrative and not limiting in any sense. Other levels, types of levels, and/or configurations of levels may be specified by the proximity heuristic in other embodiments. Examples of other levels and/or types of levels may include, but are not limited to, object trajectory levels (e.g., levels of trajectories at which an object 330 may move with respect to the surface of the display screen 220), distance levels associated with distances of an object 330 from a particular location on the display screen 220 (e.g., a location of a graphic displayed on the display screen 220), acceleration levels associated with accelerations of an object 330, position levels associated with positions of an object 330 within object detection zone 310, and speed levels of an object in one or more other directions (e.g., in a direction within the X-Y plane).

In certain embodiments, the proximity heuristic may specify combinations of levels, which may be associated with combinations or sub-combinations of any of the levels mentioned above. To illustrate, distance levels 510 and speed levels 610 may be used in combination to determine one or more actions to be performed. As an example, each of a plurality of distance levels 510 may be associated with a plurality of speed levels 610. Proximity interface facility 160 may be configured to identify a distance level 510 and a speed level 610 associated with a detected object 330, and to identify and initiate an action based on the combination of identified distance level 510 and speed level 610. Hence, an object 330 moving at a certain speed may trigger a different action when located within one distance level 510 than when moving at the same speed within another distance level 510. Similarly, an object 330 moving at a certain speed within a distance level 510 may trigger a different action than an object 330 moving at another speed within the same distance level 510.

As mentioned above, a level associated with an object detection zone 310 may be associated with one or more actions, as specified by the proximity heuristic. In certain embodiments, certain types of levels may be associated with certain types of actions. For example, distance levels 510 may be respectively associated with one type of actions (e.g., displaying certain information or types of information on the display screen 220) and speed levels 610 may be associated with another type of actions (e.g., displaying a certain level or amount of detail or information) in certain implementations. As an example, a relatively slow speed level may be associated with an action for displaying a high amount of detail on the display screen 220, and a relatively high speed level may be associated with an action for displaying a low amount of detail on the display screen 220. Similarly, a distance level 510 associated with relatively large distance may be associated with an action for displaying one type of information (e.g., basic information) on the display screen 220, and another distance level associated with a relatively short distance may be associated with an action for displaying a another type of information (e.g., contextual information) on the display screen 220. Other associations between actions and levels and/or types of actions and types of levels may be used in other implementations.

Exemplary actions that may be associated with levels of an object detection zone 310 by the proximity heuristic will now be described. Any suitable actions may be used. In certain embodiments, an action may include modifying a GUI view displayed on the display screen 220. The modification may include changing one or more GUI elements such as one or more graphics included in a GUI view. Examples of such modifications may include, but are not limited to, adding an additional element to a GUI, removing an element from a GUI, changing an amount of detail in a GUI, displaying additional information in a GUI, displaying a type of information in a GUI, changing a size of a GUI and/or an element in the GUI, changing a resolution of a GUI view and/or GUI element, highlighting a GUI element, changing an intensity, color, hue, saturation, orientation, brightness, view angle, content, or other attribute of a GUI element, moving a GUI element, rotating a GUI element, zooming in or out of a GUI element and/or view, and any other action that may be performed on a GUI view and/or element.

In certain embodiments, the actions may include actions performed in different degrees. For example, a first action may include changing a resolution of a GUI element to a certain value, and a second action may include changing the resolution of the GUI element to another value. Accordingly, levels associated with an object detection zone 310 may be associated with actions of different degrees. For example, selection of distance level 510-5 may trigger modification of a resolution of a GUI element to a certain value, and selection of another distance level 510-3 may trigger modification of the resolution of the GUI element to another value. Hence, as an object 330 moves nearer to the display screen 220 through different distance levels 510, the resolution of a GUI element displayed on the display screen 220 may be changed by different degrees.

Figure 7A:
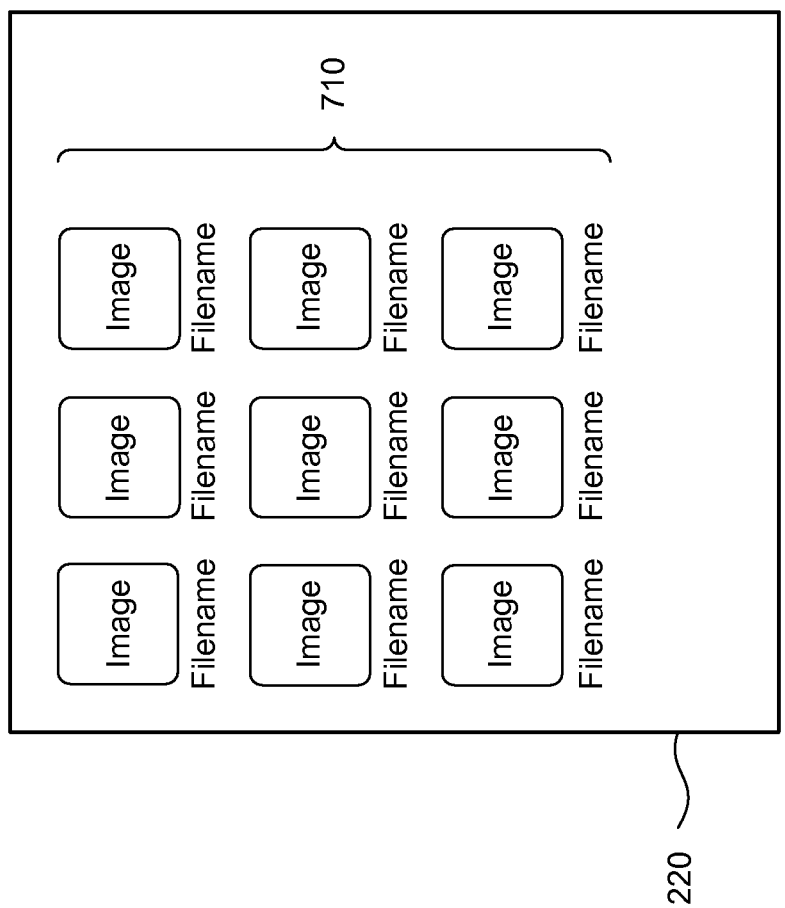
FIGS. 7A-7D illustrate exemplary graphical user interface ("GUI") views that may be displayed on a display screen.
Figure 7B:
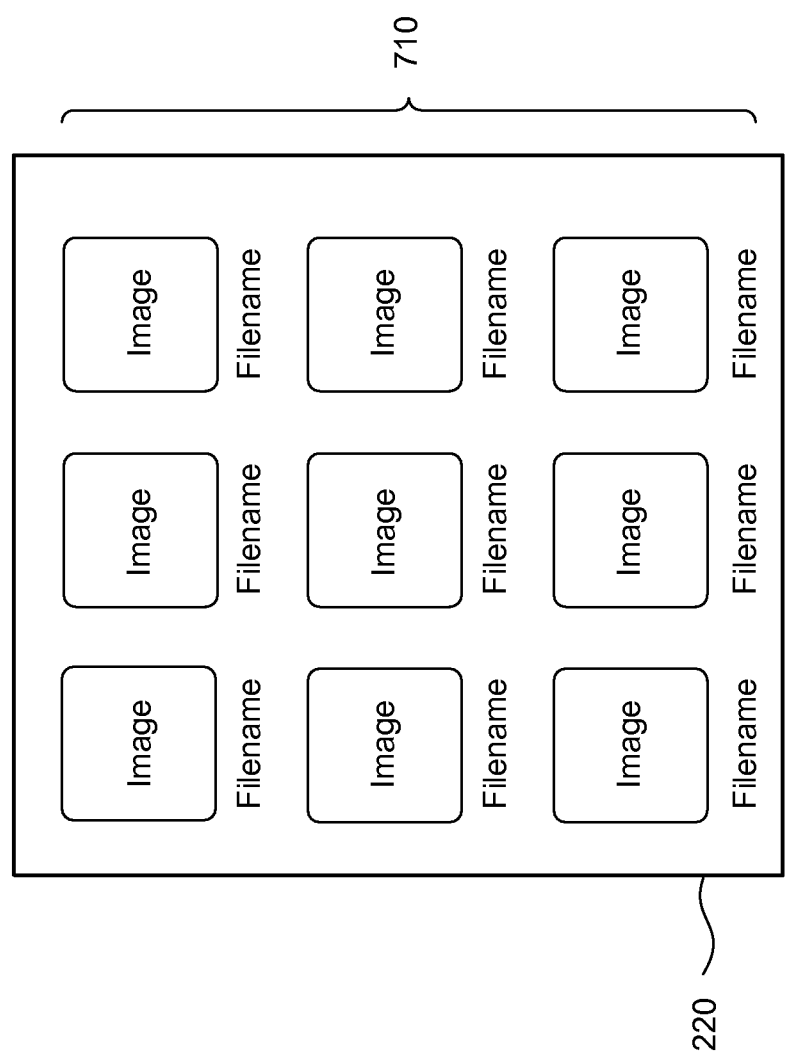

To help facilitate an understanding of exemplary actions associated with levels of an object detection zone 310, FIGS. 7A-7D illustrate exemplary GUI views that may be displayed on a display screen 220. FIG. 7A illustrates a GUI view including a plurality of graphics 710 representative of a library of image files (e.g., photos) and corresponding filenames. In response to detection of an object 330 being located within object detection zone 310, proximity interface facility 160 may determine an attribute of the object 330, select one of a plurality of levels associated with the object detection zone 310 based on the attribute of the object 330, and initiate performance of an action associated with the selected level. The action may include modifying the GUI view shown in FIG. 7A in any of the ways mentioned above. For example, FIG. 7B illustrates another GUI view in which certain ones of the graphics 710 have been enlarged and repositioned and other ones of the graphics 710 have been removed from the GUI view. FIG. 7B may represent a GUI view after performance of an action including zooming in on the GUI view of FIG. 7A.

Figure 7C:
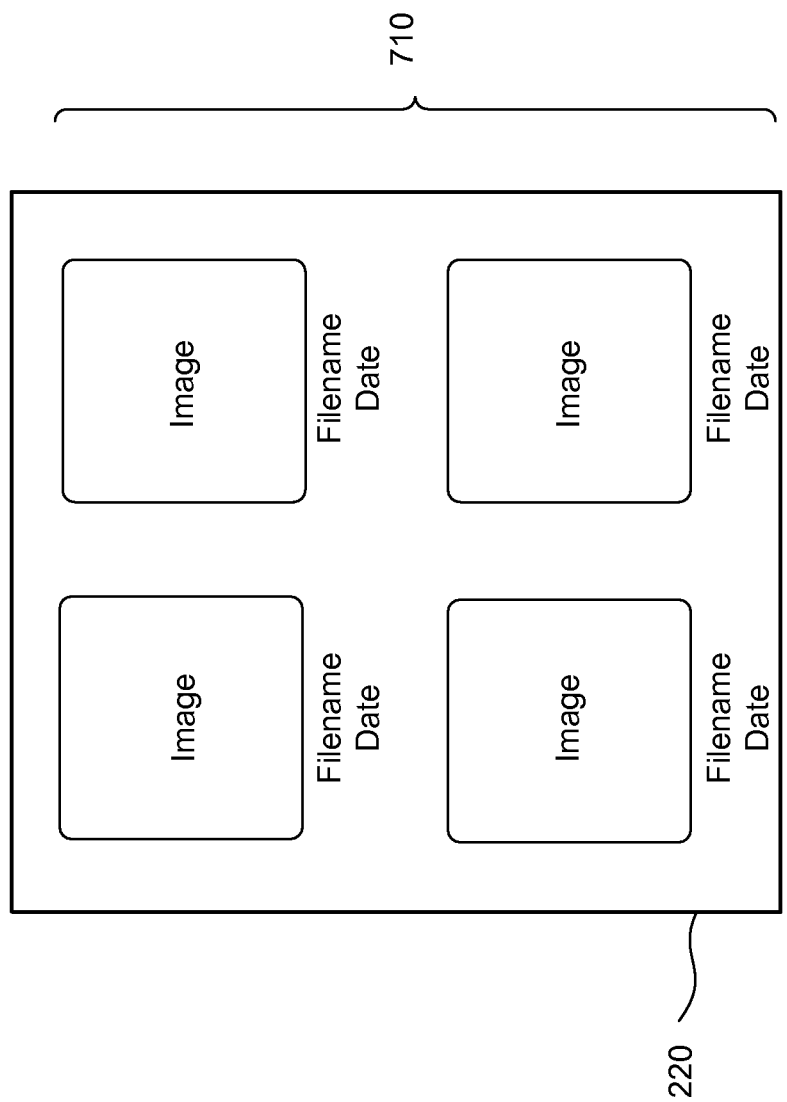

If a change to an attribute of object 330 is later detected and another level selected based on the changed attribute of the object 330, an action associated with the other level by the proximity heuristic may be performed. For example, FIG. 7C illustrates another GUI view in which certain ones of the graphics 710 have been enlarged and repositioned again and other ones of the graphics 710 have removed from the GUI view. FIG. 7C may represent a GUI view after performance of an action modifying the GUI view again by zooming further in on the GUI view of FIG. 7B. FIG. 7C further illustrates GUI view after performance of an action further modifying the GUI view by adding additional information and/or detail. In the illustrated example, the additional information is a date (e.g., date of creation) associated with each of the image files represented in the GUI view.

As an example, object 330 may be detected at a position within object detection zone 310 and associated with distance level 510-5 specified by the proximity heuristic. In response, the GUI view shown in FIG. 7A may be modified to become the GUI view shown in FIG. 7B. If object 330 is then detected at a position associated with distance level 510-4 specified by the proximity heuristic, the GUI view shown in FIG. 7B may be modified to become the GUI view shown in FIG. 7C. In this or similar manner, a GUI view displayed on the display screen 220 may be modified based on movement of object 330 within the object detection zone 310 (e.g., movement of object 330 nearer to the surface of the display screen 220).

Figure 7D:
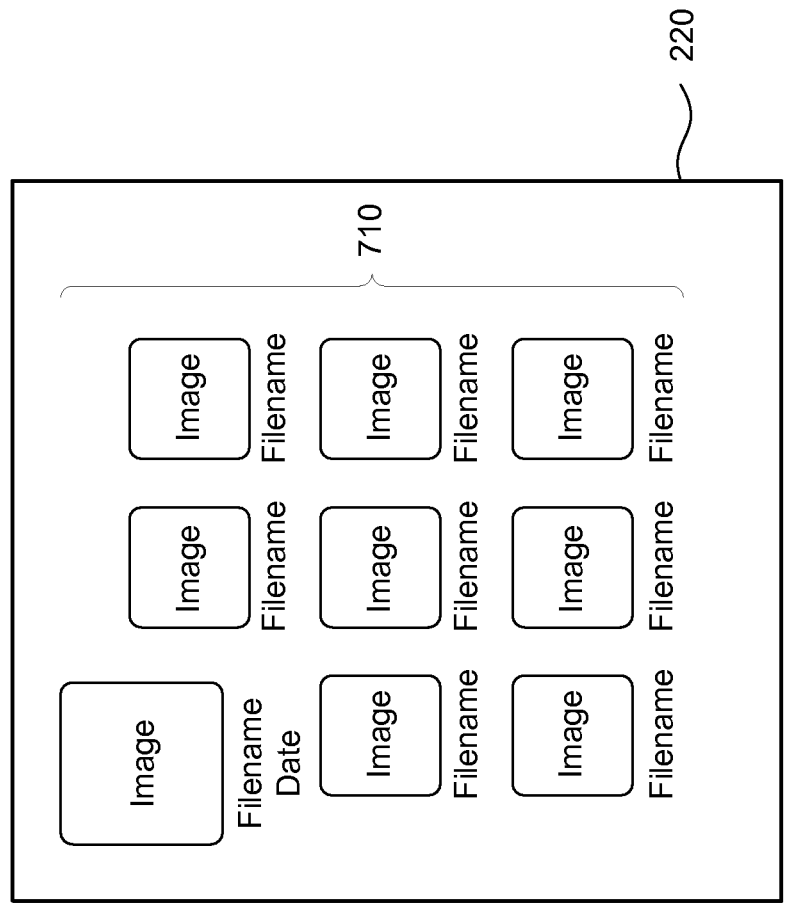

While FIGS. 7A-7C illustrate certain exemplary actions modifying certain GUI views, the examples are illustrative only. Other actions may be performed, including actions to modify GUI views in other ways in association with levels of an object detection zone 310 and/or one or more attributes of an object 330 located with the object detection zone 310. For example, FIG. 7D illustrates an exemplary GUI view, which may be a modified version of the GUI view shown in FIG. 7A. In this particular example, a graphic 710 associated with a particular image file has been enlarged while other graphics 710 associated with other image files have not been modified. In addition, additional information associated with the particular image file (e.g., a date associated with the file) has been added to the GUI view in FIG. 7D. In this or similar manner, actions may be performed to modify only select elements of a GUI view. For example, an action may be performed to modify graphic 325-1 associated with object detection zone 310-2 shown in FIG. 3C, and a different action may be performed to modify graphic 325-2 associated with object detection zone 310-3 shown in FIG. 3C.

In certain embodiments, one or more of the exemplary actions mentioned above may be performed to manipulate one or more 3-D graphics displayed on display screen 220. Accordingly, object 330 may be moved and/or positioned within object detection zone 310 in order to control display of a 3-D graphic in a GUI view. For example, movements of object 330 generally in the direction of the Z-axis may be used to zoom in on and zoom out from the 3-D graphic (e.g., movement of object 330 toward the display screen 220 may be used to zoom in on the 3-D graphic and movement of object 330 away from the display screen 220 may be used to zoom out from the 3-D graphic), and movements of object 330 generally in the X-axis and/or Y-axis directions may be used to cause the 3-D object to rotate within a GUI. Proximity interface facility 160 may be configured to initiate rotation and zooming actions on the 3-D object in response to such movements within object detection zone 310.

In certain embodiments, the proximity interface facility 160 may be configured to recognize unintentional user input. For example, a proximity heuristic may be configured to recognize certain objects 330 in an object detection zone 310 as typical of an unintended interface interaction. Examples of such unintended interface interactions may include, but are not limited to, rubbing of a display screen 220 in a clothes pocket, a person grabbing a display screen 220 with multiple fingers, jostling of a display screen 220 in a briefcase, and any other unintentional interaction of an object 330 with an object detection zone 310.

System 100 may be configured to take appropriate action in response to unintentional user input. The proximity heuristic may specify associations between unintentional interface interactions and one or more actions. Accordingly, detection of unintentional interface interactions may trigger appropriate actions such as ignoring the interaction or activating or deactivating an input interface and/or display screen 220. For example, a proximity interface, touch screen interface, and/or a display screen 220 may be turned on or off in response to detection of an unintentional interface interaction such as when the display screen 220 is detected to be in a clothes pocket or a briefcase. In this or similar manner, proximity interface facility 160 may determine, based on a proximity heuristic, when an object 330 in object detection zone 310 is associated with unintentional user input and initiate an appropriate action.

Figure 8A:
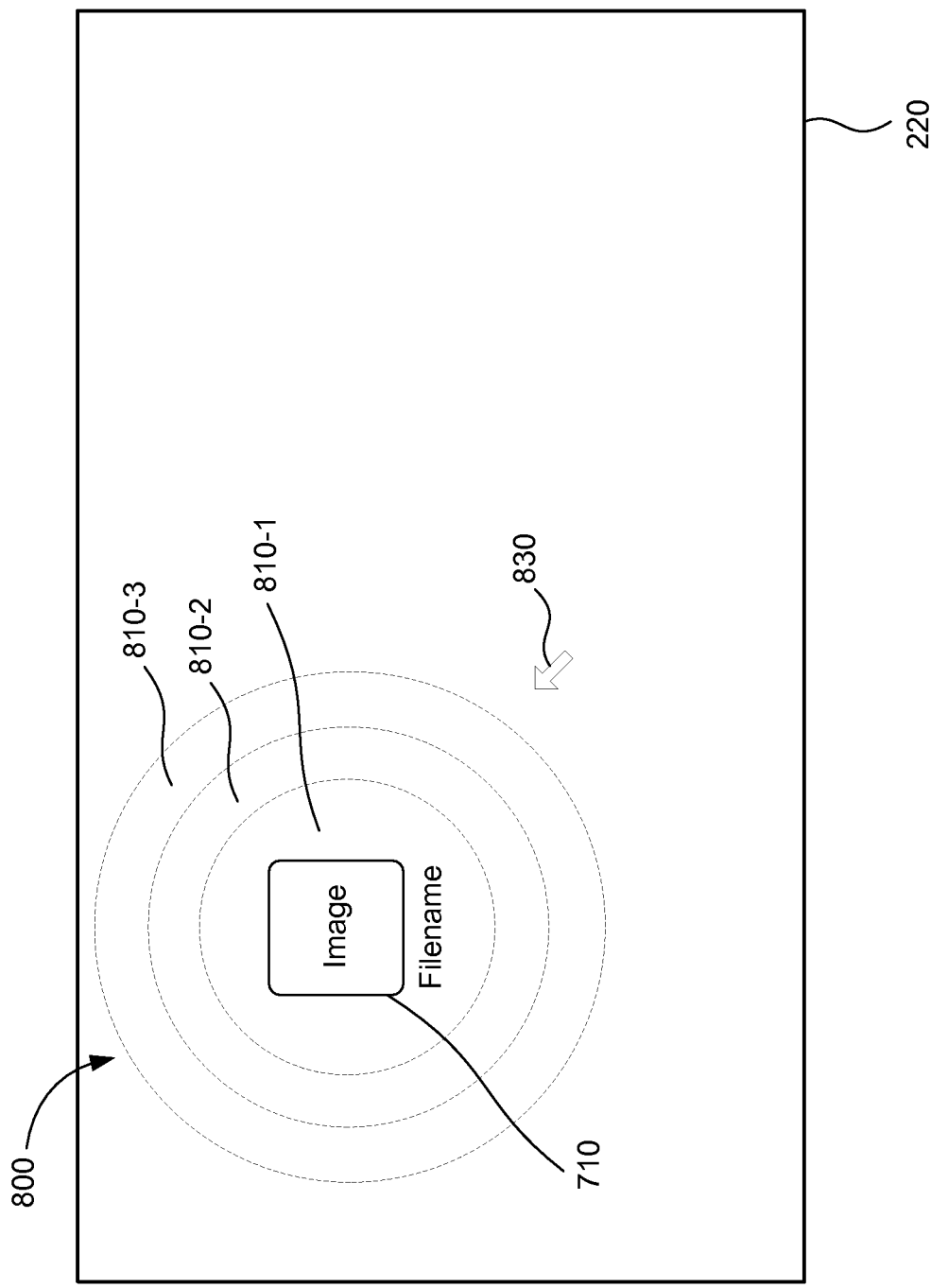
FIGS. 8A-8C illustrate another exemplary object detection zone associated with a display screen and various positions of an object relative to the exemplary object detection zone.
Figure 8B:
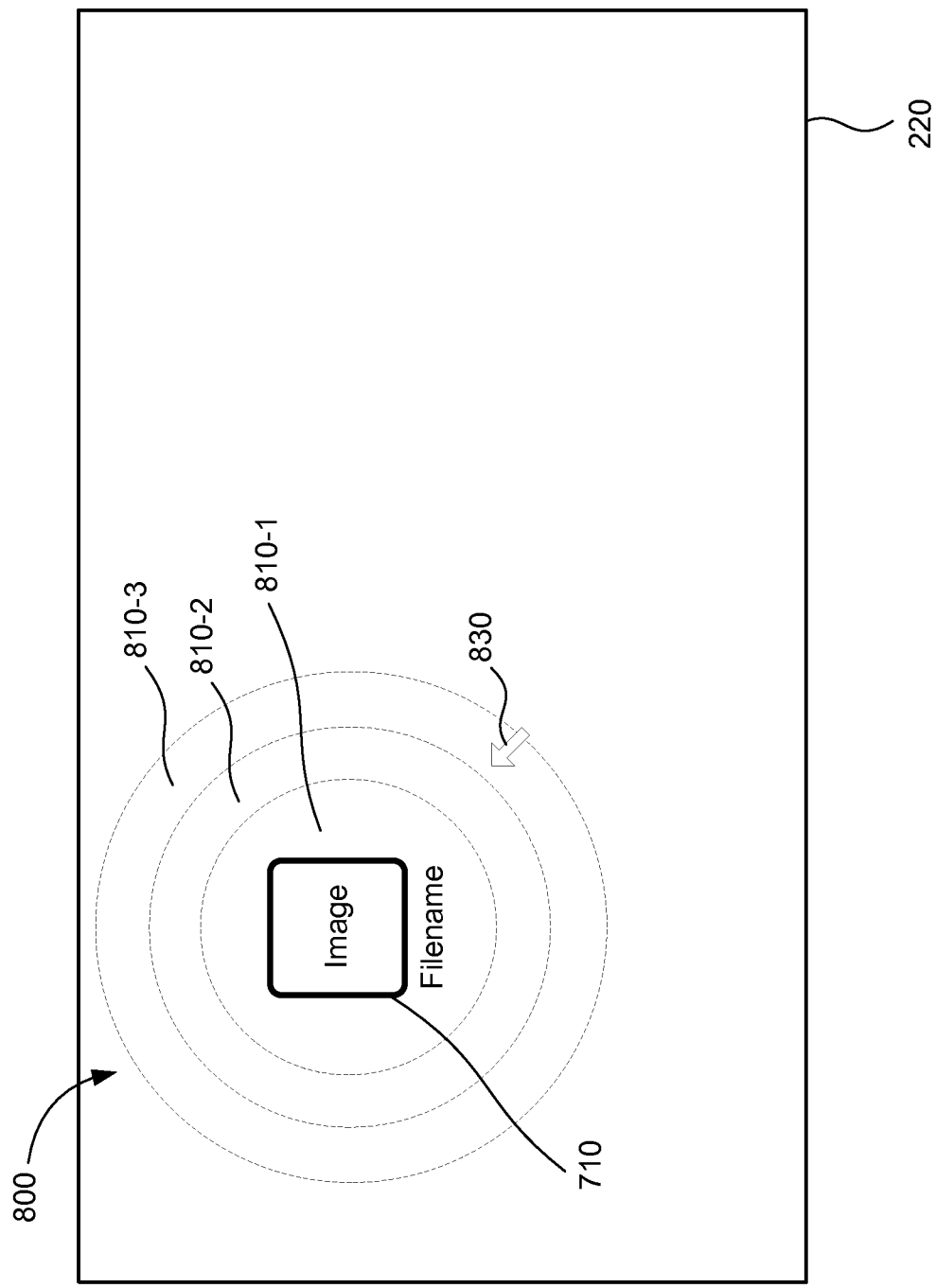
Figure 8C:
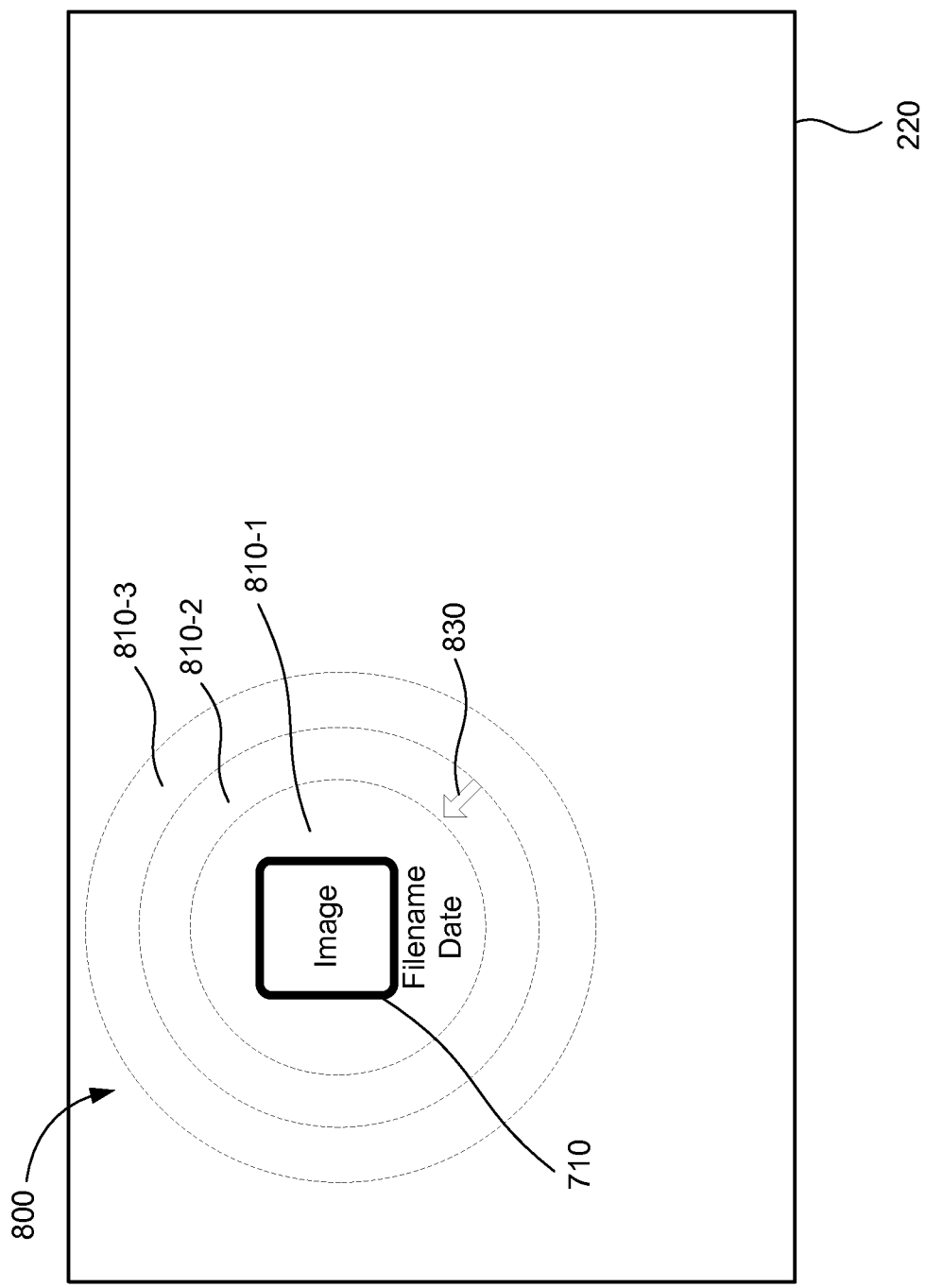

The embodiments described above are illustrative of certain exemplary proximity interfaces. Other proximity interfaces, including variations of the embodiments described above, may be implemented in other embodiments. For example, FIGS. 8A-8C illustrate another exemplary object detection zone 800 associated with a display screen 220. Object detection zone 800 is shown in conjunction with a GUI view that may be displayed on the display screen 220 and includes a graphic 710 representative of an image file and corresponding filename. As shown, object detection zone 800 may include an area space within the GUI view and/or on the surface of the display screen 220. Hence, object detection zone 800 may be located on the display screen 220 proximate to graphic 710 as illustrated.

A plurality of distance levels 810 (e.g., 810-1 through 810-3) may be associated with object detection zone 800 and may include distance intervals corresponding with different distances or ranges of distances from graphic 710. Proximity interface facility 160 may be configured to detect an object 830 located within the object detection zone 800. Object 830 may include an on-screen graphic (e.g., a mouse pointer or cursor) that may be moved about within the GUI view by user input. Proximity interface facility 160 may detect object 830 in any suitable way, including interacting with an application associated with the object 830 to access object data (e.g., position data). From the object data, proximity interface facility 160 may determine one or more attributes of object 830, such as a position, speed, trajectory, and direction of the object 830.

Proximity interface facility 160 may select one of the distance levels 810 associated with object detection zone 800 based on one or more attributes of the object 830. For example, a distance level 810 may be selected based on the position of the object 830.

An action associated with the selected level by the proximity heuristic may be performed. The action may include any of the actions mentioned above, or any other suitable action. For example, in response to a movement of object 830 from the position shown in FIG. 8A to the position shown in FIG. 8B, graphic 710 may be modified, such as by increasing a brightness and/or contrast associated with graphic 710 as shown in FIG. 8B. If object 830 moves again to the position shown in FIG. 8C, graphic 710 may be modified again, such as by further increasing a brightness and/or contrast associated with graphic 710 as shown in FIG. 8C. Hence, as object 830 approaches graphic 710, one or more visual characteristics of graphic 710 and/or the GUI view including graphic 710 may be modified.

While object 830 is described above to include an on-screen graphic, this is illustrative only. In other implementations, proximity interface facility 160 may be configured to detect another object such as a finger touching the display screen 220 within object detection zone 800.

Figure 9:
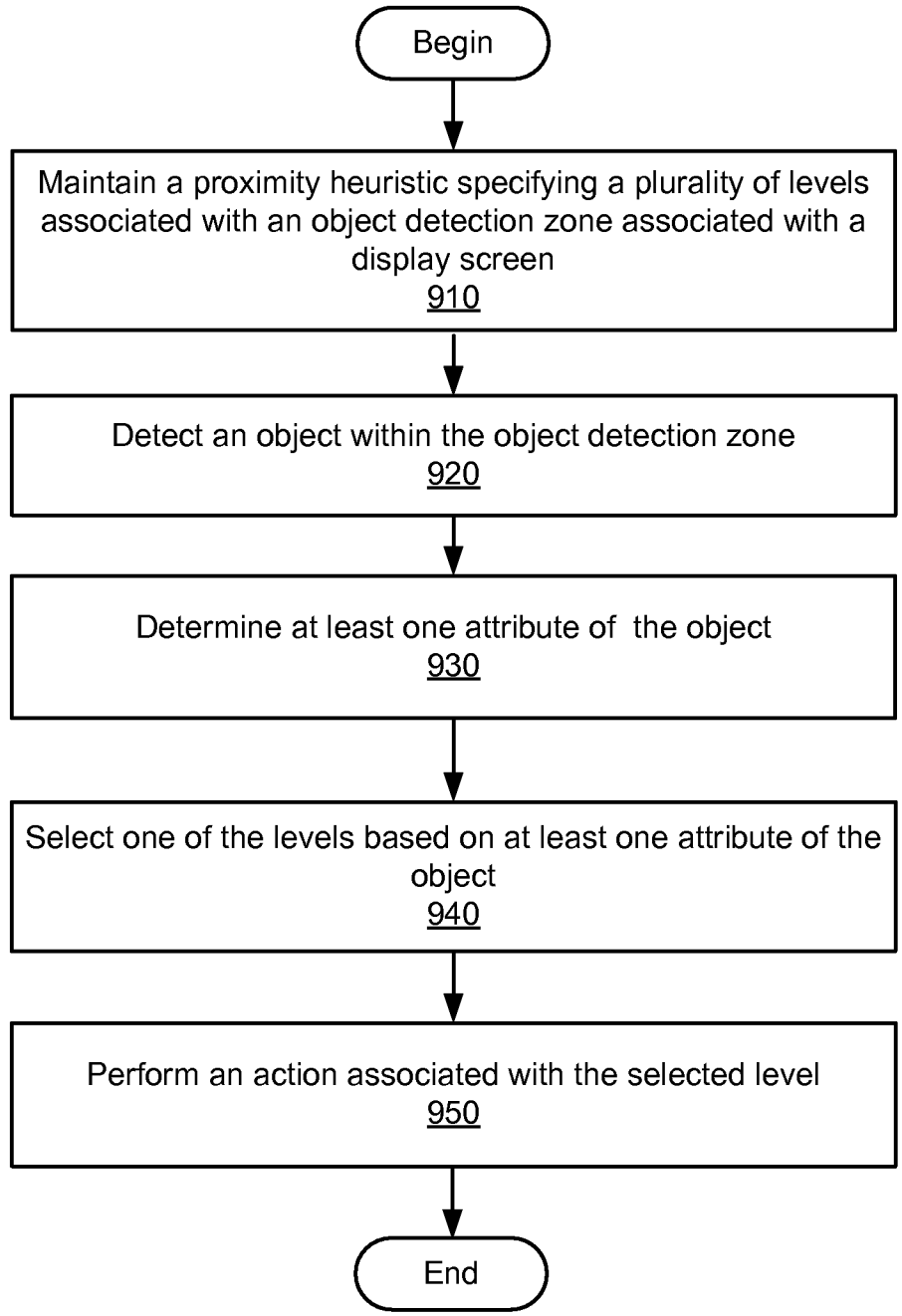
FIG. 9 illustrates an exemplary proximity interface method.

FIG. 9 illustrates an exemplary proximity interface method. While FIG. 9 illustrates exemplary steps according to one embodiment, other embodiments may omit, add to, reorder, and/or modify any of the steps shown in FIG. 9.

In step 910, a proximity heuristic specifying a plurality of levels associated with an object detection zone associated with a display screen is maintained. Step 910 may be performed in any of the ways described above, including proximity interface facility 160 maintaining data representative of the proximity heuristic in storage facility 130.

In step 920, an object is detected within the object detection zone. Step 920 may be performed in any of the ways described above and for any of the exemplary object detection zones described above.

In step 930, at least one attribute of the object is determined. Step 930 may be performed in any of the ways described above, including proximity interface facility 160 determining one or more attributes based on sensor data and in accordance with the proximity heuristic.

In step 940, one of the levels associated with the object detection zone is selected based on at least one attribute of the object. Step 940 may be performed in any of the ways described above, including proximity interface facility 160 matching an attribute to a level in accordance with the proximity heuristic.

In step 950, an action associated with the selected level is performed. The action may be associated with the selected level by the proximity heuristic. Step 950 may be performed in any of the ways described above, including proximity interface facility 160 identifying the action based on the proximity heuristic and initiating performance of the action. The action may include, but is not limited to, any of the exemplary actions described above.

One or more of the steps shown in FIG. 9 may be repeated. For example, a change in at least one attribute of the object may be detected and steps 940 and 950 may be repeated based on the changed attribute.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
maintaining data representative of a proximity heuristic specifying a plurality of levels of an object detection zone associated with a display screen, wherein each level within said plurality of levels is beyond a level of effective contact with said display screen;
detecting an object within said object detection zone;
selecting a distance level from said plurality of levels beyond said level of effective contact with said display screen based on a first attribute of said object;
selecting a speed level from said plurality of levels beyond said level of effective contact with said display screen based on a second attribute of said object;
identifying an action associated with a combination of said selected distance level and said selected speed level; and
performing said identified action associated with said combination of said selected distance level and said selected speed level,
wherein said first attribute comprises a distance between said object and said display screen, and said plurality of levels comprises a plurality of distance intervals.

2. The method of claim 1, wherein said second attribute comprises a speed of said object, and said plurality of levels comprises a plurality of speed intervals.

3. The method of claim 1, further comprising displaying a graphic on said display screen, wherein said object detection zone comprises a volume space associated with a location of said graphic on said display screen.

4. The method of claim 1, wherein said plurality of levels comprises at least one of a plurality of trajectory levels and a plurality of acceleration levels.

5. The method of claim 1, further comprising displaying a graphical user interface view on said display screen, wherein said performing said action includes modifying said graphical user interface view.

6. The method of claim 5, wherein said modifying includes changing at least one of a resolution, a detail level, an orientation, a brightness, and content of a graphic included in said graphical user interface.

7. The method of claim 1, tangibly embodied as computer-executable instructions on at least one non-transitory computer-readable medium.

8. A method comprising:
displaying a graphical user interface view on a display screen;
detecting an object within an object detection zone adjacent to said display screen;
selecting a distance level from a plurality of levels beyond said level of effective contact with said display screen in said object detection zone based on a first attribute of said object and in accordance with a proximity heuristic;
selecting a speed level from said plurality of levels beyond said level of effective contact with said display screen based on a second attribute of said object;
identifying a modification to said graphical interface view associated with a combination of said selected distance level and said selected speed level; and
modifying said graphical user interface view according to said identified modification to said graphical interface view associated with said combination of said selected distance level and said selected speed level,
wherein said first attribute comprises a distance between said object and said display screen, and when said change to said first attribute of said object is detected, said change to said first attribute comprises a change in said distance between said object and said display screen.

9. The method of claim 8, further comprising:
detecting a change to said first attribute of said object and said second attribute of said object;
selecting another of said plurality of levels based on said change; and
further modifying said graphical user interface view based on said another of said plurality of levels.

10. The method of claim 9, wherein said second attribute comprises a speed of said object, and when said change to said second attribute of said object is detected, said change to said second attribute comprises a change in said speed of said object.

11. The method of claim 9, wherein said modifying said graphical user interface view comprises zooming in on said graphical user interface, and wherein said further modifying said graphical user interface view includes zooming further in on said graphical user interface view.

12. The method of claim 9, wherein said modifying said graphical user interface view comprises changing at least one of a resolution, a detail level, an orientation, a brightness, and content of a graphic included in said graphical user interface view.

13. The method of claim 12, wherein said further modifying said graphical user interface view comprises further changing at least one of a resolution, a detail level, an orientation, a brightness, and content of said graphic included in said graphical user interface view.

14. The method of claim 8, wherein said modifying comprises rotating a three-dimensional graphic included in said graphical user interface view.

15. A system comprising:
- a non-transitory storage facility configured to store data representative of a proximity heuristic, said proximity heuristic specifying a plurality of levels of an object detection zone associated with a display screen and one or more associations between said plurality of levels and a plurality of actions, wherein each level within the plurality of levels is beyond a level of effective contact with the display screen; and
- a proximity interface facility configured to
    - detect an object located within said object detection zone,
    - select a distance level from said plurality of levels beyond said level of effective contact with said display screen based on a first attribute of said object and in accordance with said proximity heuristic,
    - select a speed level from said plurality of levels beyond said level of effective contact with said display screen based on a second attribute of said object and in accordance with said proximity heuristic,
    - identify at least one action within said plurality of actions associated with a combination of said selected distance level and selected speed level; and
    - initiate performance of said identified at least one of said actions within said plurality of actions associated with said combination of said selected distance level and said selected speed level,
- wherein said plurality of levels beyond said level of effective contact with said display screen includes a plurality of discrete distances away from said display screen and said selected distance level comprises one of said discrete distances among said plurality of discrete distances.

16. The system of claim 15, wherein said identified at least one of said actions within said plurality of actions includes modifying a graphical user interface view displayed on said display screen.

17. The system of claim 15, wherein said first attribute comprises a distance between said object and said display screen and said second attribute comprises a speed of said object.

* * * * *